(12) United States Patent
Applegate et al.

(10) Patent No.: US 8,650,860 B2
(45) Date of Patent: Feb. 18, 2014

(54) CATALYST TEMPERATURE CONTROL SYSTEM FOR A HYBRID ENGINE

(75) Inventors: Brian C. Applegate, Peoria, IL (US); William L. Easley, Jr., West Peoria, IL (US); Michael S. Bond, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 957 days.

(21) Appl. No.: 11/806,299

(22) Filed: May 31, 2007

(65) Prior Publication Data

US 2008/0295493 A1 Dec. 4, 2008

(51) Int. Cl.
*F01N 3/00* (2006.01)
*F01N 3/02* (2006.01)
*F01N 3/10* (2006.01)

(52) U.S. Cl.
USPC ............... 60/295; 60/286; 60/297; 60/300; 60/301; 60/303; 60/311

(58) Field of Classification Search
USPC ........... 60/285, 274, 286, 295, 297, 298, 300, 60/301, 303, 311, 320
See application file for complete search history.

(56) References Cited

U.S. PATENT DOCUMENTS

| | | | |
|---|---|---|---|
| 5,323,868 A | 6/1994 | Kawashima | |
| 5,327,991 A | 7/1994 | Yoshida | |
| 5,345,761 A | 9/1994 | King et al. | |
| 5,545,928 A | 8/1996 | Kotani | |
| 5,822,983 A | 10/1998 | Ikeda | |
| 5,987,885 A | 11/1999 | Kizer et al. | |
| 6,032,753 A | 3/2000 | Yamazaki et al. | |
| 6,057,605 A | 5/2000 | Bourne et al. | |
| 6,362,535 B1 | 3/2002 | Tilyou et al. | |
| 6,421,599 B1 | 7/2002 | Lippa et al. | |
| 6,422,001 B1 | 7/2002 | Sherman et al. | |
| 6,871,489 B2 * | 3/2005 | Tumati et al. | 60/285 |
| 6,901,751 B2 * | 6/2005 | Bunting et al. | 60/297 |
| 7,007,460 B2 | 3/2006 | Frieden et al. | |
| 7,007,464 B1 * | 3/2006 | Asami et al. | 60/300 |
| 7,213,397 B2 * | 5/2007 | Hu et al. | 60/295 |
| 7,418,816 B2 * | 9/2008 | Upadhyay et al. | 60/285 |
| 2003/0160455 A1 | 8/2003 | Hu et al. | |
| 2006/0016175 A1 * | 1/2006 | Pott et al. | 60/285 |
| 2007/0017215 A1 | 1/2007 | Matheaus et al. | |

FOREIGN PATENT DOCUMENTS

| | | |
|---|---|---|
| GB | 2326857 A | 6/1998 |
| GB | 2344059 | 5/2000 |
| GB | 2384728 | 8/2003 |
| JP | 6112715 (A) | 4/1994 |
| JP | 771236 | 3/1995 |
| JP | 10089053 (A) | 4/1998 |
| JP | 10339130 (A) | 12/1998 |
| JP | 2006-132394 | * 5/2006 |

* cited by examiner

*Primary Examiner* — Thomas Denion
*Assistant Examiner* — Diem Tran
(74) *Attorney, Agent, or Firm* — Finnegan, Henderson, Farabow, Garrett & Dunner LLP

(57) ABSTRACT

A temperature control system is provided for use with a hybrid engine. The system includes a controller configured to receive a signal representative of a temperature associated with a selective catalytic reduction (SCR) catalyst configured to receive an exhaust gas stream produced by a hybrid engine. The controller is also configured to transmit a first signal to a generator operably coupled to a battery and the hybrid engine, and transmit a second signal to a heater configured to heat the SCR catalyst, wherein the first and second signals are configured to regulate the temperature associated with the SCR catalyst.

11 Claims, 2 Drawing Sheets

CATALYST TEMPERATURE CONTROL SYSTEM FOR A HYBRID ENGINE

TECHNICAL FIELD

The present disclosure is directed to a temperature control system and, more particularly, to a catalyst temperature control system for a hybrid engine.

BACKGROUND

Hybrid engines typically include an electric motor and an internal combustion engine. Engines, including diesel engines, gasoline engines, gaseous fuel-driven engines, and other engines known in the art, traditionally exhaust a complex mixture of pollutants. These emissions may include gaseous and solid material, such as, particulate matter, nitrogen oxides (NOx), and sulfur compounds. Heightened environmental concerns have led regulatory agencies to increase the stringency of emission standards for such engines, forcing engine manufactures to develop systems to further reduce levels of engine emissions.

Various devices and methods are used to reduce emission levels, including after-treatment devices such as nitrogen oxide absorbers, sulfur oxide absorbers, and hydrocarbon catalysts. These devices operate by reacting exhaust gases with a chemical catalyst to transform pollutants into less harmful products, such as water and nitrogen. One method for reducing exhaust emissions is selective catalytic reduction (SCR). During SCR, a catalyst facilitates a reaction between ammonia and NOx to produce water and nitrogen gas, thereby reducing NOx levels in the exhaust gas.

While catalysts can reduce emission levels, they generally operate most efficiently within a limited temperature range. However, exhaust gas temperatures can fluctuate dramatically during normal engine operation, and these fluctuations can significantly reduce catalytic efficiency. Several devices and methods have been used to maintain suitable exhaust gas temperatures, including heating systems such as fuel burners, microwave technology, and electric heaters.

One method for controlling exhaust temperature is disclosed in U.S. Patent Application Publication No. 2007/0017215 (hereinafter "the '215 application") of Matheaus et al., published on Jan. 25, 2007. The '215 application describes a hybrid engine and a lean NOx trap (LNT) after-treatment system. The system described by the '215 application varies the torque loading on the hybrid engine using an electric motor. Increased loading raises exhaust temperatures and thus reduces temperature fluctuations experienced by the LNT. Additionally, heaters powered by electrical energy supplied by the hybrid motor can be used to heat the exhaust.

Although the system of the '215 application may reduce emission levels, LNTs have several limitations. LNTs require frequent regeneration, such as, every thirty seconds. Also, the system of the '215 application requires torque sensors or other devices to dampen engine oscillations caused by frequent LNT regeneration, and frequent switching between rich and lean operating conditions can adversely affects engine efficiency.

The present disclosure is directed at overcoming one or more of the limitations in the prior art.

SUMMARY OF THE INVENTION

One aspect of the present disclosure is directed toward a temperature control system, including a controller configured to receive a signal representative of a temperature associated with a selective catalytic reduction (SCR) catalyst configured to receive an exhaust gas stream produced by a hybrid engine. The controller is also configured to transmit a first signal to a generator operably coupled to a battery and the hybrid engine, and to transmit a second signal to a heater configured to heat the SCR catalyst, wherein the first and second signals are configured to regulate the temperature associated with the SCR catalyst.

Another aspect of the present disclosure is directed to a power system, including a hybrid engine configured to produce an exhaust gas stream. The power system also includes a generator operably coupled to the hybrid engine and configured to supply electrical power to a battery, a selective catalytic reduction (SCR) catalyst configured to receive the exhaust gas stream, and a heater configured to heat the SCR catalyst. Additionally, the power system includes a controller operably connected to the generator and the heater, wherein the controller is configured to receive a signal representative of a temperature associated with the SCR catalyst.

BRIEF DESCRIPTION OF THE DRAWINGS

The accompanying drawings, which are incorporated in and constitute a part of this specification, illustrate exemplary embodiments of the disclosure and, together with the written description, serve to explain the principles of the disclosed system.

DETAILED DESCRIPTION

Figure 1:
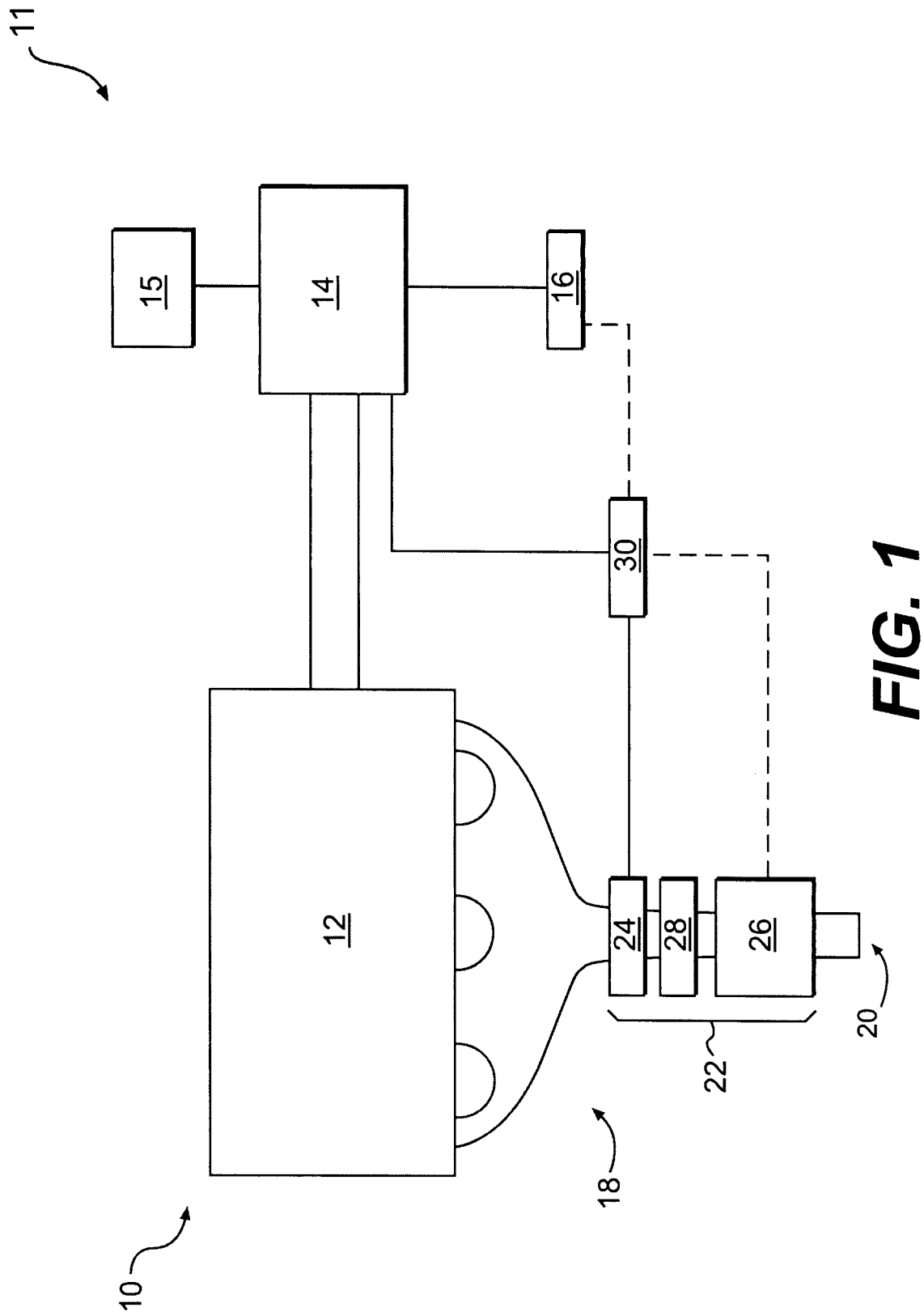
FIG. 1 provides a schematic representation of a machine including a power source, according to an exemplary disclosed embodiment.

FIG. 1 provides a schematic representation of a machine 10 including a power source 12. Machine 10 can include a hybrid engine 11, wherein hybrid engine 11 can include power source 12 and an electric motor 15. As described herein, hybrid engine 11 can include various types and configurations of power source 12 and electric motor 15.

In some embodiments, power source 12 may include any type of internal combustion engine. For example, power source 12 could be configured to operate on any type of fuel, including diesel, gasoline, ethanol, gaseous fuel, bio-fuel, or any other fuel type or combination of fuels. Further, power source 12 may be configured to provide power to an on-highway vehicle, construction or mining equipment, a factory or power plant, or any other type of mobile or stationary machine known in the art.

Power source 12 can be operably associated with a generator 14 configured to convert mechanical energy into electric energy. In some embodiments, power source 12 or generator 14 can be configured to provide energy to propel machine 10. For example, electric motor 15 can be configured to receive electrical power and propel machine 10, wherein electric motor 15 could include an AC or DC motor of any type known in the art.

Machine 10 can include various components configured to reduce emission levels of exhaust gases produced by power source 12. As described in detail below, temperatures of catalysts and other exhaust components can be regulated via electronic control. Additionally, machine 10 can include various components or subsystems configured to facilitate production of mechanical or electrical power. For example, machine 10 can include a battery 16 configured to store electrical power produced by generator 14 or supply stored electrical energy to electric motor 15. Machine 10 can also include an exhaust system 18 configured to receive exhaust gas produced by power source 12. Other subsystems could include a fuel system, an air induction system, a lubrication system, a cooling system, or any other appropriate systems (not shown).

Generator 14 can be operatively coupled to power source 12, e.g., via a shaft, belt, or transmission system. Generator 14 can include any type of generator, such as, for example, a permanent magnet, induction, switched-reluctance, or combination generator. Various generator designs may be used, including sealed, brushless, or liquid cooled. Also, generator 14 could produce a direct current (DC) output or an alternating current (AC) output. AC or DC outputs may be converted via a power converter (not shown) to produce any current or voltage output required by machine 10.

Battery 16 can include any suitable battery, capacitor, or other device configured to store electrical power. As shown in FIG. 1, battery 16 can store electric energy produced by generator 14. For example, if machine 10 is operating under low loads, generator 14 can convert excess mechanical energy into electric energy for storage by battery 16. Battery 16 can also be configured to supply electrical energy, such as, for example, during operation or starting machine 10. Generator 14 or battery 16 could also provide electrical power to other components (not shown) of machine 10.

Exhaust system 18 can be configured to receive an exhaust gas stream produced by power source 12. Specifically, exhaust system 18 can include an exhaust passage 20 fluidly connected to power source 12. Exhaust system 18 can also include one or more after-treatment devices 22 fluidly connected to exhaust passage 20 and configured to remove or reduce pollutants in the exhaust gas prior to release into the atmosphere. After-treatment devices 22 can include various filters, catalysts, or other devices, such as, for example, a heater 24 and a selective catalytic reduction (SCR) catalyst 26.

In some embodiments, exhaust system 18 can include one or more heaters 24 configured to heat one or more after-treatment devices 22. For example, heater 24 could be configured to heat SCR catalyst 26. Heater 24 could be configured to directly heat SCR catalyst 26, or indirectly heat SCR catalyst 26 by partially increasing exhaust gas temperature. Heater 24 can include a fuel burner, microwave heater, electric heater, or any other type of heater known in the art.

SCR catalyst 26 can be configured to receive of flow of exhaust gas produced by power source 12. SCR catalyst 26 can also be configured to facilitate a chemical reaction involving constituents of the exhaust gas. For example, SCR catalyst 26 can include a NOx-reducing catalyst configured to facilitate a reaction between ammonia and NOx to at least partially remove NOx from the exhaust gas flow.

SCR catalyst 26 can include a catalytic medium having a material configured to react with one or more constituents of the exhaust gas. The material can be formed from sintered metallic particles such as, for example, aluminum, titanium, platinum, or any other high-temperature alloy. The material can also be formed from ceramic particles including, silicon carbide, cordierite, mullite, or any other ceramic particles known in the art. Formation of the material can be achieved using a casting process, an injection molding process, or any other process that produces a porous material with a desired porosity.

To operate efficiently, SCR catalyst 26 requires sufficient ammonia to react with NOx to reduce NOx levels. However, power source 12 operating under lean combustion conditions can produce exhaust gas containing relatively low levels of ammonia. To operate more efficiently, SCR catalyst 26 may require additional ammonia to facilitate a more complete reaction between ammonia and NOx. To provide additional ammonia to SCR catalyst 26, an ammonia source 28 may be fluidly connected to exhaust passage 20. In some embodiments, ammonia source 28 may require a heater (not shown), cooler (not shown), thermal insulation (not shown), or other similar device configured to maintain a suitable ammonia temperature, such as, to prevent freezing.

Ammonia source 28 can include any device or system configured to provide ammonia to an exhaust flow produced by power source 12. Ammonia source 28 could provide direct injection of urea into the exhaust flow, which is readily converted to ammonia. Ammonia source 28 could also include an ammonia-producing catalyst configured to convert at least a portion of the exhaust gas into ammonia. The ammonia-producing catalyst can be made from a variety of materials, such as, for example, platinum, palladium, rhodium, iridium, copper, chrome, vanadium, titanium, iron, or cesium. Combinations of these materials may be used, and the catalyst material may be chosen based on the type of fuel used, the air to fuel-vapor ratio desired, or for conformity with environmental standards.

Ammonia may be produced by a reaction between NOx and other substances in exhaust gas produced by power source 12. For example, ammonia may be produced by reacting NOx with a variety of other combustion byproducts, such as, $H_2$ (hydrogen gas), $C_3H_6$ (propene), or CO (carbon monoxide). In addition, the efficiency of catalytic conversion of NOx to ammonia can be improved under rich conditions. Therefore, a fuel source (not shown) could be added to exhaust system 18 to supply fuel to exhaust passage 20 to form a rich exhaust gas upstream of ammonia source 28 and SCR catalyst 26. In some embodiments, an ammonia-reducing catalyst (not shown) may be added downstream to reduce the levels of ammonia contained in the exhaust gas flow. Also, various oxidation catalysts (not shown) may be added to exhaust system 18 to at least partially control ratios of different oxides of nitrogen, such as nitric oxide and nitrogen dioxide, as some catalysts may function more effectively at certain oxide ratios.

Catalytic devices generally operate more efficiently within a limited temperature range. However, exhaust temperatures vary significantly at different engine operating conditions. In order to improve catalytic efficiency over a wide range of different engine operating conditions, it can be beneficial to regulate catalyst temperature.

A controller 30 can be configured to control a temperature associated with one or more after-treatment devices 22, such as, SCR catalyst 26. Various commercially available microprocessors can be configured to perform one or more functions of controller 30. Also, one or more operations of controller 30 could be performed by a general engine microprocessor, or a microprocessor capable of controlling other functions of machine 10. Controller 30 can include a memory, a secondary storage device, a processor, or any other components required to transmit or receive signals. Other circuits may be associated with controller 30, such as power supply circuitry, signal conditioning circuitry, solenoid driver circuitry, and other types of circuitry.

Controller 30 may embody a single microprocessor or multiple microprocessors configured to control a temperature associated with after-treatment device 22. Controller 30 can be configured to provide continuous or intermittent control to regulate the temperature of one or more after-treatment devices 22. For example, controller 30 can be configured to transmit a signal to heater 24 to activate heater 24 to at least partially heat SCR catalyst 26. Controller 30 may also be configured to monitor a temperature associated with SCR catalyst 26. Based on reception of such a signal, controller 30 could be configured to regulate the signal transmitted to heater 24. Controller 30 may further be configured to transmit a signal to one or more components of machine 10, such as, for example, generator 14 or battery 16.

Controller 30 can be configured to receive a signal representative of a temperature associated with one or more components of exhaust system 18. For example, a signal representative of a temperature associated with SCR catalyst 26 can be received by controller 30. In operation, a sensor (not shown) may be located and configured to output a signal associated with SCR catalyst 26. In other embodiments, the sensor can be associated with exhaust passage 20 or another component of exhaust system 18. For example, a thermocouple (not shown) could be located adjacent to SCR catalyst 26 and thermally coupled to SCR catalyst 26 via a thermally conductive conduit wall. In other embodiments, a thermocouple (not shown) could be located within SCR catalyst 26 and in contact with a catalytic medium. The sensor can include any suitable type of temperature sensor and may measure gas, catalyst, or conduit temperatures. A temperature signal can be sent continuously, intermittently, or when requested by controller 30.

In some embodiments, controller 30 can be configured to perform a calculation to convert a received signal into any suitable representative value of temperature. For example, the signal may include a current or voltage reading received from a thermocouple mounted on SCR catalyst 26. Further, controller 30 could compare the SCR signal to another signal received from a separate thermocouple located on another part of machine 10 to determine a relative temperature value, or other representation of temperature.

Controller 30 could use any signal processing or algorithms known in the art to convert any suitable input signal into a temperature representation. For example, controller 30 could use other sensory inputs as a substitute for the temperature signal. Such inputs may be associated with various exhaust gas parameters, such as, for example, exhaust gas flow rate, exhaust gas pressure, or any other parameter known in the art. Controller 30 may receive and analyze such input to derive a representative temperature value. For example, exhaust system 18 may include a NOx sensor (not shown) located downstream of SCR catalyst 26. A high NOx level could indicate SCR catalyst 26 was operating at a temperature too low to sufficiently reduce NOx emissions. If controller 30 received a signal from the NOx sensor indicating a high NOx level, controller 30 could then transmit a signal to increase the temperature of SCR catalyst 26 in order to reduce NOx levels.

Controller 30 can also be configured to transmit one or more signals to various components of machine 10. In some embodiments, controller 30 could be configured to transmit a signal to modify a hybrid engine parameter, including an air-intake parameter, an exhaust gas parameter, a fuel input parameter, an engine speed, or an engine load. The air-intake parameter could be modified via control of various valves or other devices configured to modify a flow of air into hybrid engine 11, such as, for example, a variable-geometry turbocharger. The exhaust gas parameter could be modified by back-pressure valves or other devices configured to modify an exhaust flow from power source 12. The fuel input parameter could be modified by control of fuel injection systems. These parameters could be modified to adjust operation of power source 12 to at least partially change a temperature of exhaust gas produced by power source 12. Modifying the exhaust gas temperature can also function to modify the temperature associated with one or more after-treatment devices 22.

Controller 30 may also be configured to receive one or more signals from various components of machine 10. For example, controller 30 could be configured to receive a signal representative of a power level associated with battery 16. A low power level from battery 16 may trigger charging of battery 16 by generator 14, increasing the power output from generator 14. Such increased power output may add additional load to power source 12, and thus increase exhaust gas temperature. Controller 30 may then transmit a signal to heater 24 to reduce heat supplied to SCR catalyst 26 by heater 24, as additional heat can be supplied to SCR catalyst 26 by increased heat transfer from the exhaust gas flow at elevated temperature.

In some embodiments, controller 30 can be configured to output a signal to control the temperature of one or more components of exhaust system 18. In particular, controller 30 can be configured to control a temperature associated with SCR catalyst 26. For example, controller 30 could transmit at least one signal to other components or subsystems of machine 10 to maintain the temperature associated with SCR catalyst 26 within a range of about 200° C. to about 400° C.

Controller 30 could be configured to control an operation of one or more components of machine 10. In some embodiments, controller 30 can control heater 24 to at least partially raise a temperature associated with SCR catalyst 26. For example, controller 30 could control the flow of electrical power to heater 24 from battery 16 or generator 14. In particular, generator 14 could provide power directly to heater 24 during engine start-up when rapid heating of SCR catalyst 26 can be required. In other embodiments, controller 30 could control generator 14 to at least partially vary the electrical loading on power source 12. By increasing the electrical load of generator 14, power source 12 must increase power output. Such an increase in power output generally increases the temperature of exhaust gas produced by power source 12. Controller 30 could function to increase the electrical loading of generator 14 applied to power source 12, thereby increasing the temperature of exhaust gas. Such an increase in exhaust gas temperature could be regulated to maintain the temperature associated with SCR catalyst 26 with a limited range, as previously described.

Increasing the electrical loading of generator 14 can also be achieved using other components of machine 10. For example, controller 30 could also control battery 16 to increase the power requirements of generator 14. Increasing current flow from battery 16 to heater 24 could decrease the power levels of battery 16. Decreased power levels could trigger generator 14 to produce more electrical energy for supply to battery 16, and thereby increase the electrical load applied to power source 12. Such actions could increase exhaust gas temperature produced by power source 12, which could indirectly heat one or more after-treatment devices 22, such as, for example, SCR catalyst 26.

Temperature regulation of SCR catalyst 26, or any other component of exhaust system 18, could also be achieved by transmitting a plurality of signals from controller 30. For example, a first signal transmitted from controller 30 to generator 14 and a second signal transmitted from controller 30 to heater 24 could both function to increase a temperature associated with SCR catalyst 26, as previously described. Other signals or additional signals could also be transmitted to other components of machine 10 to increase a temperature associated with one or more after-treatment devices 22.

Figure 2:
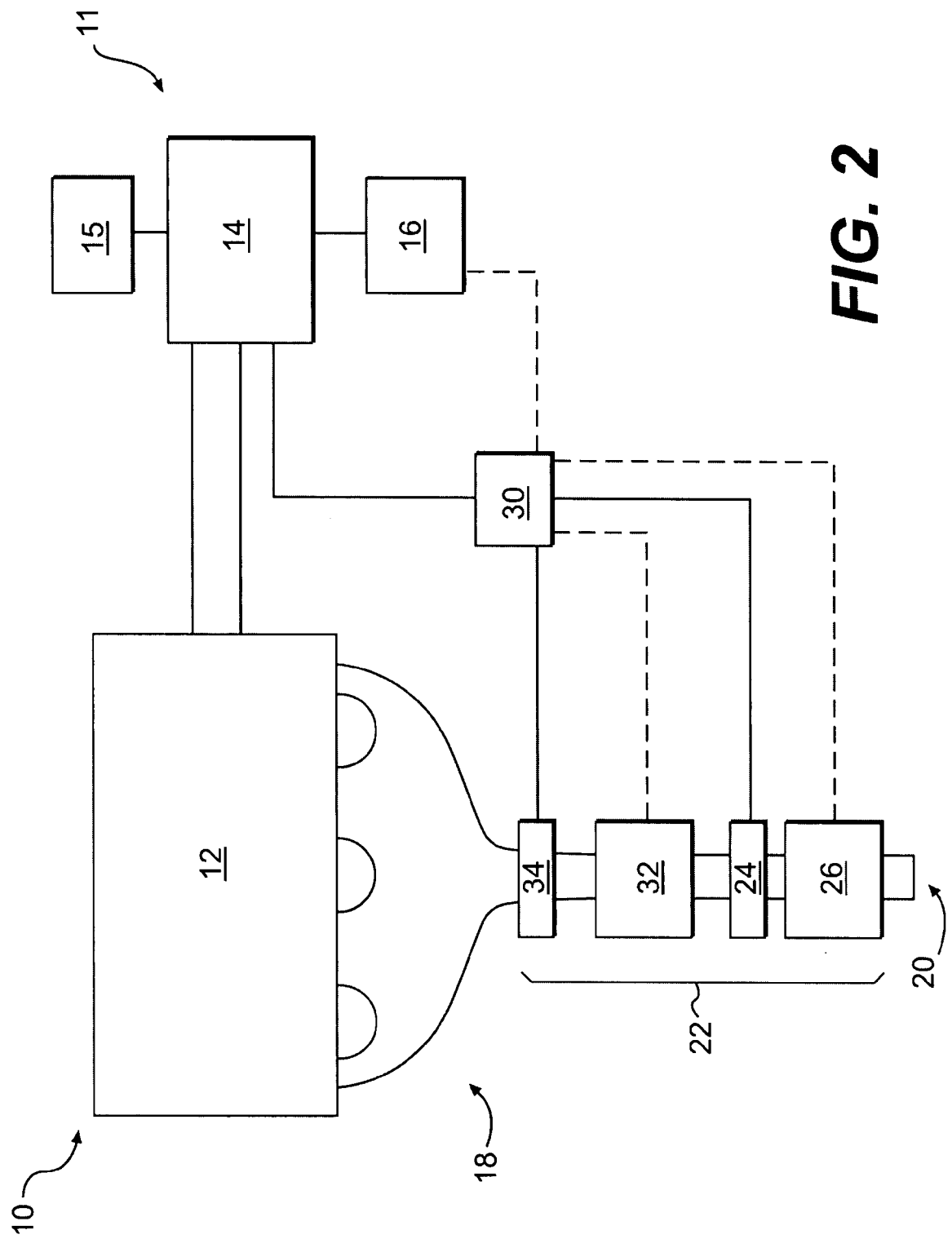
FIG. 2 provides a schematic representation of a machine including a power source, according to another exemplary disclosed embodiment.

FIG. 2 provides a schematic representation of machine 10 including power source 12, according to another exemplary disclosed embodiment. As shown, exhaust system 18 can include a filter 32, wherein filter 32 can include any general type of device configured to at least partially remove particulate matter from an exhaust flow. The filter media may assist in removing particulate matter like soot, soluble organic fraction (SOF), and other pollutants produced by power source 12.

Filter 32 can include any type of filter media, such as, for example, ceramic, sintered metal, silicon carbide, or other type filter known in the art. Filter media may be situated horizontally, vertically, radially, or in any other configuration permitting proper filtration. Additionally, filter 32 may be of a honeycomb, mesh, mat, or any other configuration that provides an appropriate surface for trapping particulate matter. Filter 32 could also contain pores, cavities or spaces of a size that allows exhaust gas to flow through while substantially restricting the passage of particulate matter.

Exhaust system 18 can also include a heater 34 capable of heating filter 32. Heater 34 could include any type of heater as previously described. Some configurations of exhaust system 18 may require only one heater, yet other configurations may require a plurality of heaters. In some embodiments, heater 34 could be fluidly connected to exhaust passage 20 and located upstream of filter 32. In other embodiments, heater 34 could be configured to heat filter 32 directly.

Controller 30 could be configured to control a temperature associated with filter 32. As previously described for SCR catalyst 26, controller 30 could be configured to receive a signal representative of a temperature associated with filter 32. Controller 30 can also be configured to transmit one or more signals to control one or more components of machine 10 to regulate the temperature associated with filter 32. For example, controller 30 could transmit a signal to activate heater 34 to at least partially heat filter 32. Controller 30 could function to regulate the temperatures of filter 32 and SCR catalyst 26 by controlling one of more heaters, or one or more components of machine 10, as previously described for SCR catalyst 26.

Heater 34 could be configured to heat filter 32 during a filter regeneration process. Regeneration is the process by which trapped particulate matter is "burnt off" the filter by sufficiently elevating the filter's temperature. Additionally, controller 30 could be configured to detect when filter 34 required regeneration, or periodically perform regeneration. For example, controller 30 could transmit at least one signal to maintain the temperature associated with filter 32 within a range of about 250° C. to about 400° C.

INDUSTRIAL APPLICABILITY

The present disclosure provides a hybrid engine for use with a selective catalytic reduction (SCR) system. The SCR system may be used to reduce emission levels of the hybrid engine. The disclosed exhaust treatment system may reduce or eliminate the need for inefficient, expensive, and unreliable devices, such as lean NOx traps requiring frequent regeneration.

Controller 30 of the present disclosure is configured to regulate the temperature of one or more after-treatment devices 22, such as SCR catalyst 26 or filter 34. Controller 30 can control heater 24 or the operation of power source 12 to heat SCR catalyst 26 directly or indirectly. In some embodiments, such a system could also monitor a temperature associated with SCR catalyst 26 to provide a feedback signal. Based on the feedback signal, controller 30 may transmit at least one signal to heater 24 or component of machine 10 to control the operation of heater 24 or components of machine 10. For example, a temperature associated with SCR catalyst 26 could be regulated by adjusting the electrical load experienced by power source 12 to regulate exhaust temperatures within a limited range to ensure efficient emission reduction.

Exhaust system 18 could also include one or more filters 32, which could be heated by heater 34. Controller 30 can be configured to output one or more signals to regulate a temperature associated with filter 32 by activating heater 34, or controlling the operation of power source 12, such as, varying the electrical loading of generator 14.

Controller 30 can also be configured to regulate the operating temperature range of SCR catalyst 26 and filter 32. In some situations, controller 30 could increase an operating temperature of one or more after-treatment devices 22. For example, controller 30 could control the regeneration of filter 32 by periodically increasing the temperature of filter 32 above its "light off" temperature. Controller 30 could also increase the temperature of SCR catalyst 26 or filter 32 during start-up, breaking, or light-load conditions of power source 12.

It will be apparent to those skilled in the art that various modifications and variations can be made in the disclosed system without departing from the scope of the disclosure. Other embodiments will be apparent to those skilled in the art from consideration of the specification disclosed herein. It is intended that the specification and examples be considered as exemplary only, with a true scope being indicated by the following claims and their equivalents.

What is claimed is:

1. A power system, comprising:
a hybrid engine configured to produce an exhaust gas stream;
a generator operably coupled to the hybrid engine and configured to supply electrical power to a battery;
a selective catalytic reduction (SCR) catalyst configured to receive the exhaust gas stream;
a heater configured to heat the SCR catalyst; and
a controller operably connected to the generator and the heater, wherein the controller is configured to:
receive a signal representative of a temperature associated with the SCR catalyst and a signal representative of a power level of the battery, and to
control the heater and the generator based at least in part on the temperature associated with the SCR catalyst and the power level of the battery,
wherein controlling the generator based at least in part on the temperature associated with the SCR catalyst includes:
loading the hybrid engine with the generator, in response to the power level of the battery being below a predefined threshold, to heat the exhaust gas stream, and
maintaining the temperature associated with the SCR catalyst within a predefined range via the heated exhaust gas stream while the power level of the battery is below the predefined threshold.

2. The power system of claim 1, wherein the power system further includes an ammonia source configured to introduce ammonia into the exhaust gas stream.

3. The power system of claim 1, wherein the controller transmits a signal to at least one of the generator and the heater to maintain the temperature associated with the SCR catalyst within the predefined range, and the predefined range is between about 200° C. and about 400° C.

4. The power system of claim 1, wherein the controller is further configured to transmit a signal to modify a hybrid engine parameter.

5. The power system of claim 1, wherein the hybrid engine includes a diesel engine.

6. The power system of claim 1, wherein the controller is further configured to:
   receive a signal representative of a temperature associated with the exhaust gas stream while the power level of the battery is below the predefined threshold, and
   modify operation of the generator, to affect a change in the temperature associated with the exhaust gas stream, in response to the signal representative of the temperature associated with the exhaust gas stream.

7. The power system of claim 1, wherein the controller is further configured to receive a signal representative of a temperature associated with a filter configured to receive a portion of the exhaust gas stream.

8. The power system of claim 7, wherein the filter includes a diesel particulate filter.

9. The power system of claim 7, further including a second heater configured to heat the filter.

10. The power system of claim 9, wherein the controller is configured to transmit a signal to the second heater to at least partially raise the temperature associated with the filter.

11. The power system of claim 10, wherein the controller is further configured to control regeneration of the filter by heating the filter using the second heater to periodically increase the temperature associated with the filter above a predefined threshold temperature.

\* \* \* \* \*